United States Patent
Davis (10) Patent No.: US 7,962,706 B2
(45) Date of Patent: Jun. 14, 2011

(54) METHODS AND SYSTEMS FOR IMPROVING READ PERFORMANCE IN DATA DE-DUPLICATION STORAGE

(75) Inventor: Camden John Davis, Saint Paul, TX (US)

(73) Assignee: Quantum Corporation, San Jose, CA (US)

( * ) Notice: Subject to any disclaimer, the term of this patent is extended or adjusted under 35 U.S.C. 154(b) by 653 days.

(21) Appl. No.: 12/031,560

(22) Filed: Feb. 14, 2008

(65) Prior Publication Data

US 2009/0210640 A1   Aug. 20, 2009

(51) Int. Cl.
    *G06F 13/18* (2006.01)
(52) U.S. Cl. .................... 711/158; 711/114; 711/162
(58) Field of Classification Search .................. None
    See application file for complete search history.

(56) References Cited

U.S. PATENT DOCUMENTS

| | | | |
|---|---|---|---|
| 2003/0163639 A1* | 8/2003 | Baum et al. | 711/113 |
| 2008/0005141 A1 | 1/2008 | Zheng et al. | |
| 2008/0276240 A1* | 11/2008 | Ganesh et al. | 718/102 |
| 2009/0019246 A1* | 1/2009 | Murase | 711/162 |
| 2009/0178059 A1* | 7/2009 | Lang et al. | 719/318 |
| 2009/0268903 A1* | 10/2009 | Bojinov et al. | 380/45 |
| 2009/0307251 A1* | 12/2009 | Heller et al. | 707/101 |

OTHER PUBLICATIONS

Intel: "Serial ATA II Native Command Queuing Overview, Application Note" Internet Citation, [online] XP0024099889 Retrieved from the Internet: URL:http://www.intel.com/design/storage/papers/252664.htm [retrieved on Nov. 28, 2009 ].

Patent Cooperation Treaty (PCT) International Search Report from co-pending PCT International Application No. PCT/US2009/032927 (International Filing Date Feb. 3, 2009), having a date of mailing of May 6, 2009.

\* cited by examiner

*Primary Examiner* — Than Nguyen (57) ABSTRACT

The present invention is directed toward methods and systems for data de-duplication. More particularly, in various embodiments, the present invention provides systems and methods for data de-duplication that may utilize a data de-duplication system that retrieves data from a data storage device in an order based on the location of blocks on the data storage device. Some embodiments break a data stream into multiple blocks of data and store the blocks of data on a data storage device of a data de-duplication system, wherein a code representing a redundant block of data is stored in place of the block of data. A location for each block of data may be stored. Additionally, the blocks may be read in an order that is determined based on the location of the blocks.

20 Claims, 5 Drawing Sheets

METHODS AND SYSTEMS FOR IMPROVING READ PERFORMANCE IN DATA DE-DUPLICATION STORAGE

FIELD OF THE INVENTION

The present invention relates generally to data processing systems, and more particularly, some embodiments relate to methods and systems for performing data de-duplication.

BACKGROUND OF THE INVENTION

Vast amounts of electronic information are stored, communicated, and manipulated by modern computer systems. Much of this vast amount of electronic information is duplicated. For example, duplicate or near duplicate copies of data may be stored on a hard drive or hard drives, communicated across a communication channel, or processed using a computer or other electronic device. This duplicated data might be used in many different applications and on many different electronic systems. Accordingly, data de-duplication technology may impact a broad range of applications.

Data de-duplication is a method of reducing or eliminating redundant files, blocks of data, etc. In this way, a data de-duplication system attempts to ensure that only unique data is stored, transmitted, processed, etc. Data de-duplication is also sometimes referred to as capacity-optimized protection. Additionally, data de-duplication may address rapidly growing capacity needs by reducing electronic information storage capacity required, transmission capacity, processor capacity, etc.

In one example of how duplicate data might exist on a computer network, an employee may email a Word® attachment to 25 co-workers. On some systems, a copy is saved for every employee the file was sent to, increasing the capacity requirement of the file by a factor of 25. In some cases data de-duplication technology may eliminate the redundant files, replacing them with "pointers" to the original data after it has been confirmed that all copies are identical. This example illustrates data de-duplication at the file level. Data de-duplication may also be implemented based on variable size blocks of data. In other words, redundant variable sized blocks of data may be eliminated by replacing these blocks with a pointer to another instance of a matching block of data.

In some cases, data duplication might occur in a data storage system. For example, archived electronic information such as electronic documents, files, programs, etc. exist on backup tapes, backup hard drives, and other media. In many cases a computer may store a large number of files, which in some cases may be duplicates of the same file or document, slightly differing versions of the same document, etc. Accordingly, duplicates or near duplicates might exist for many different types of files, including documents, graphic files, and just about any other type of computer file.

Additionally, duplication might occur when data is communicated. In computer-based systems it is common for a computer to transmit one or more files over a computer network or other communication system to, for example, other computers in the computer network. This network may be wired, wireless, or some combination of the two. Additionally, the network may use just about any computer data communication system to transmit the data.

Different types of duplication might exist. In one type, a file or files may be repeatedly transmitted by a computer. For example, it is common for data transmitted during a backup operation to be almost identical to the data transmitted during the previous backup operation. Accordingly, a computer, computer networks, etc. might also repeatedly communicate the same or similar data.

In another type of duplication, a duplicate or near duplicate file or files, such as duplicate or near duplicate document, graphic files, etc. might be stored on a computer system. In other words, multiple copies of a file might exist, as in the emailed document example. Accordingly, different types of file de-duplication systems and methods might address various types of duplication. Some types of data de-duplication systems and methods might relate to file duplication or near duplication that involves multiple copies of the same or similar files sent during the same transmission. Other types of data de-duplication systems and methods may relate to file duplication that involves the same or similar files sent during a series of transmissions. Yet other types of data de-duplication might relate to both types of file duplication or near duplication.

Data de-duplication might include both transmission for backup and the backup itself. For example, some data de-duplication systems may transmit only data that has changed since a previous backup. This data might be stored on a daily basis or perhaps a weekly basis. In some systems these changes in the data might be what is saved, for example, on a backup drive, disc, tape, etc. For example, a backup system might initially transmit a "full backup" for example, all files in a directory or series of directories, all files on a disc or on a computer, all files on all disks on an entire network, etc. The full backup might simply be all files that a particular user selects for backup. The data for the full backup may be transmitted and stored using various communication and storage systems. After the full backup, subsequent backups might be based on only files that have changed. These might be the only files subsequently transmitted, stored or both. Of course, a user might also select to do a full backup from time to time after the initial full backup.

Systems that only make full backups might be required to store a large amount of data. This may increase the expenses associated with these types of systems due to, for example, the cost of additional hard drives, tape media, data CD's or DVD's, wear on disc drives, CD or DVD drives, tape drives, etc. Accordingly, incremental systems might be more efficient in terms of data storage, mechanical wear on system components, etc.

There are two main types of de-duplication. These methods are inline or offline. Inline de-duplication is performed by a device in the data path. This may reduce the disk capacity required to store electronic data thereby increasing cost savings. A disadvantage of inline de-duplication is that the data is processed while it is being transmitted for backup, which may slow down the backup process.

In contrast, offline data de-duplication does not perform the data de-duplication in the data path, but instead performs the process at the backup system. This may require more data storage capacity, such as, for example, disk capacity. Performance may, however, be improved by having the process reside outside of the data path, after the backup job is complete. In other words, because the data is processed after being transmitted for backup, the processing generally will not slow the transmission.

Some de-duplication systems use a process that detects if a block of data has already been saved and replaces the duplicate blocks with pointers to the originally saved block. Generally over time, as more and more data is placed into the de-duplicated storage, new blocks in files point to previously stored blocks. In some cases, the location of the original blocks will tend to migrate toward a random distribution given a sufficient amount of time and enough data. The randomness of the locations is commonly referred to as fragmentation; simply meaning at least some sequential blocks do not reside in sequential locations on the storage medium. Accordingly, an application sequentially reading from the beginning of the file, which has a high degree of de-duplication, is likely to suffer degradation in performance due to the amount of positioning required to retrieve the data in sequential order.

Figure 1:
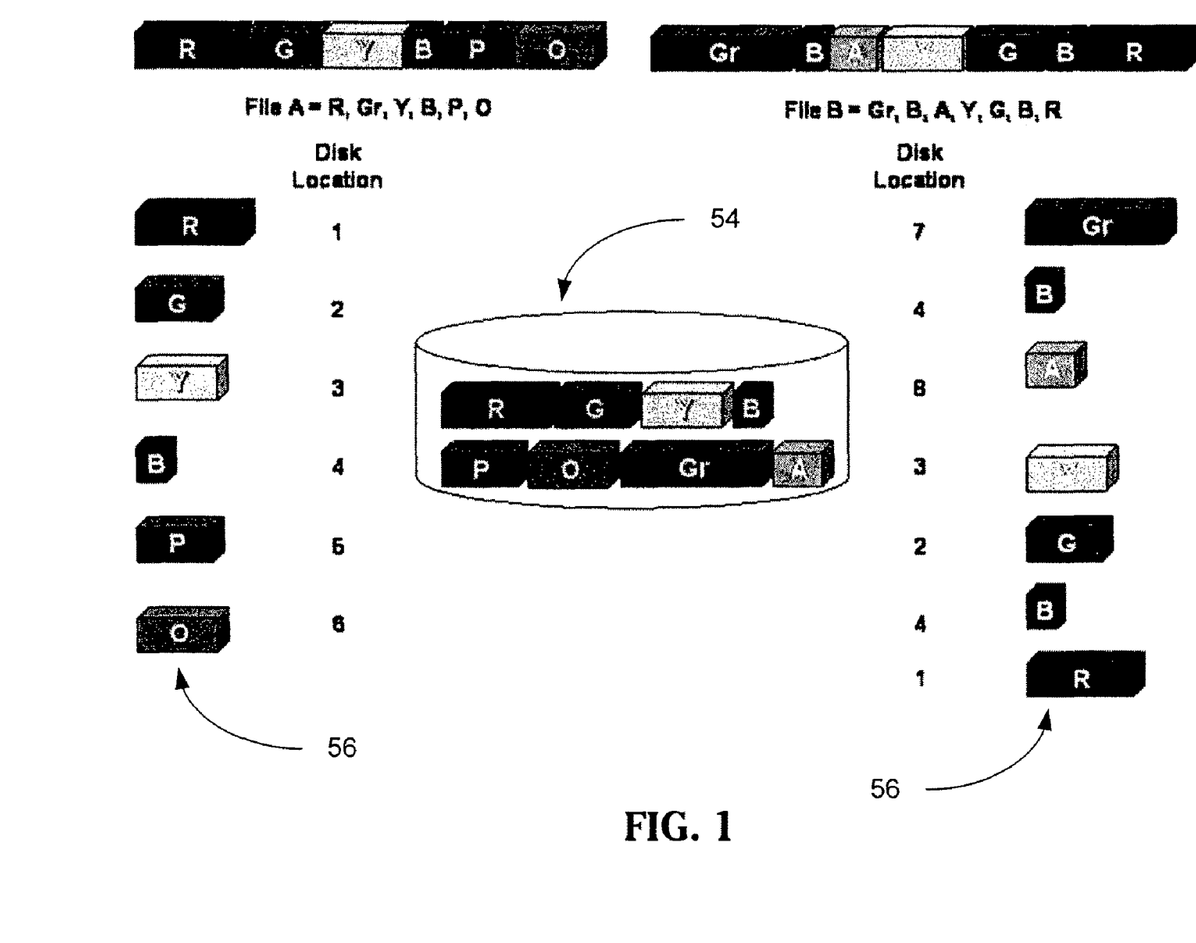
FIG. 1 is a diagram illustrating a data de-duplication system.

FIG. 1 is a diagram illustrating a data de-duplication system. The problem discussed above may be further illustrated with reference to the data de-duplication system of FIG. 1. In the example of FIG. 1, file A, is de-duplicated and stored in the storage pool 54, which in this example is a disk. The challenges, however, are not limited to a disk alone. Tape drives and other storage devices might also suffer performance degradation because of fragmentation. The blocks are stored sequentially and the pointers to the data for the file point to locations 1-6, 56. When file B is de-duplicated and stored in the storage pool 54, only two unique blocks are detected so the unique data is stored and the pointers to blocks originally stored in file A are used. The pointer to the block locations that make up file B are 7, 4, 8, 3, 2, 4, and 1, 56. (Note that block B, which is stored at disk location 4 occurs twice in file B.) As is illustrated in FIG. 1, reading sequentially through file B will require a position between each block read, thus degrading performance.

BRIEF SUMMARY OF THE INVENTION

The present invention is directed toward methods and systems for data de-duplication. More particularly, in various embodiments, the present invention provides systems and methods for data de-duplication that may utilize storage reclamation In accordance with some embodiments of the systems and methods described herein, data storage in a data de-duplication system may comprise breaking a data stream into multiple blocks of data and storing the blocks of data on a data storage device of a data de-duplication system. In various embodiments, a code representing a redundant block of data may be stored in place of the block of data. This code may be, for example, a hash, CRC, address, or other indicator that may be used to identify a block of data. Some embodiments may store a location for each block of data and determine the order to read the blocks based on the location of each block on the data storage device. The blocks may then be read using the order determined. In various embodiments, the data blocks may be buffered and reordered after being read.

In accordance with some embodiments of the systems and methods described herein, storing a location for each block of data may comprise storing a location to a pointer that points to a block of data or storing a pointer that points directly to a block of data. If a pointer that points directly to a block of data is used, this may eliminate additional reads to the data storage system because the location may be read directly, rather than reading the pointer and then reading the block of data at the address indicated by the pointer. In some embodiments, the location of each block may comprise a physical location or an indication of a physical location on a storage media. For example, a physical location on a platter of a hard drive might be stored.

In accordance with some embodiments of the systems and methods described herein, the data storage device may be a disk drive, tape drive, or other data storage device. Additionally, in some embodiments, multiple data storage devices may be connected together in an array of storage devices. For example, an array of disk drives, an array of tape drives, or an array of other types of data storage devices might be used. Additionally, various embodiments might include multiple types of data storage devices, for example, disk drives and tape drives.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DESCRIPTION OF THE PREFERRED EMBODIMENTS

In some embodiments, retrieving data from a de-duplicated storage pool may be accomplished through a request for data associated with a tag or cookie and identifying a destination file location. For each tag, the de-duplication engine may keep information regarding the association as well as the original order and offset of each block. In various embodiments, the de-duplication engine might acquire additional information as to the physical location in the storage pool of each block. In some embodiments, the additional information could either be acquired once or kept with the saved block information. In other embodiments, the additional information might be acquired at the beginning of the read operation prior to reading any blocks. The location information may then be used to perform reads in a manner, which might be preferable to the order of the blocks in the original file based on, for example, the characteristics of the underlying storage pool.

Before describing the invention in detail, it is useful to describe an example environment with which the invention can be implemented. FIG. 1 illustrates a data storage system 100 with which the present invention can be implemented. System 100 in the illustrated example includes computing devices 105*a-b*, a network 110, a server 115, an array of storage disk 120, and a storage area network 130. Computing devices 105*a-b* can be any of a variety of computing devices including, for example, laptops, desktops, workstations, personal digital assistants (PDAs), handheld computing devices, or other types of computing devices.

Network 110 can be implemented using any of a variety of network architectures or topologies. Such networks might include, for example, the internet, a local area network (LAN), a wide area network (WAN), a plain old telephone system (POTS), or any other suitable network or communications channel. In the illustrated example, computing devices 105*a-b* and server 115 are connected to network 110. The connection to network 110 can be wireless or through a wired connection.

Server 115 can be any server system such as, for example, a conventional standalone file server configured to provide data services to a client device such as device 105*a*. Server 115 can be scalable to increase storage capacity such as, for example, by adding storage disk array 120. Disk array 120 can be implemented as, for example, a direct-attached storage (DAS system). In the example architecture illustrated in FIG. 2, system 100 includes a storage pool 130, which includes switch 135, disk array 140, router 145, and a tape server 150. Server 115, disk array 120, and the storage pool 130 can be implemented using one or more types of storage architectures such as, for example, small computer system interface (SCSI), serial advanced technology attachment (SATA), serial attached SCSI (SAS), or fiber channel (FC).

Generally, a legacy SCSI system with an 8-bit wide bus can typically deliver data at a rate of approximately 40 megabytes per second ("MBps"), whereas contemporary 16-bit wide bus SCSI systems can deliver data up to 320 MBps. Typical SATA systems are generally less expensive than an equivalent SCSI system and can provide performance close to that of the 16-bit wide bus SCSI system at 300 MBps.

FC systems offer several advantages such as pooled resources, flexible backup capability, scalability, fast data transfer (up to 800 MBps full-duplex 4 Gbit link), and the ability to accommodate long cable lengths. FC systems may have cable lengths up to 10 kilometers as compared to a maximum cable length of 25 meters for other system such as, for example, a SCSI system.

Figure 2:
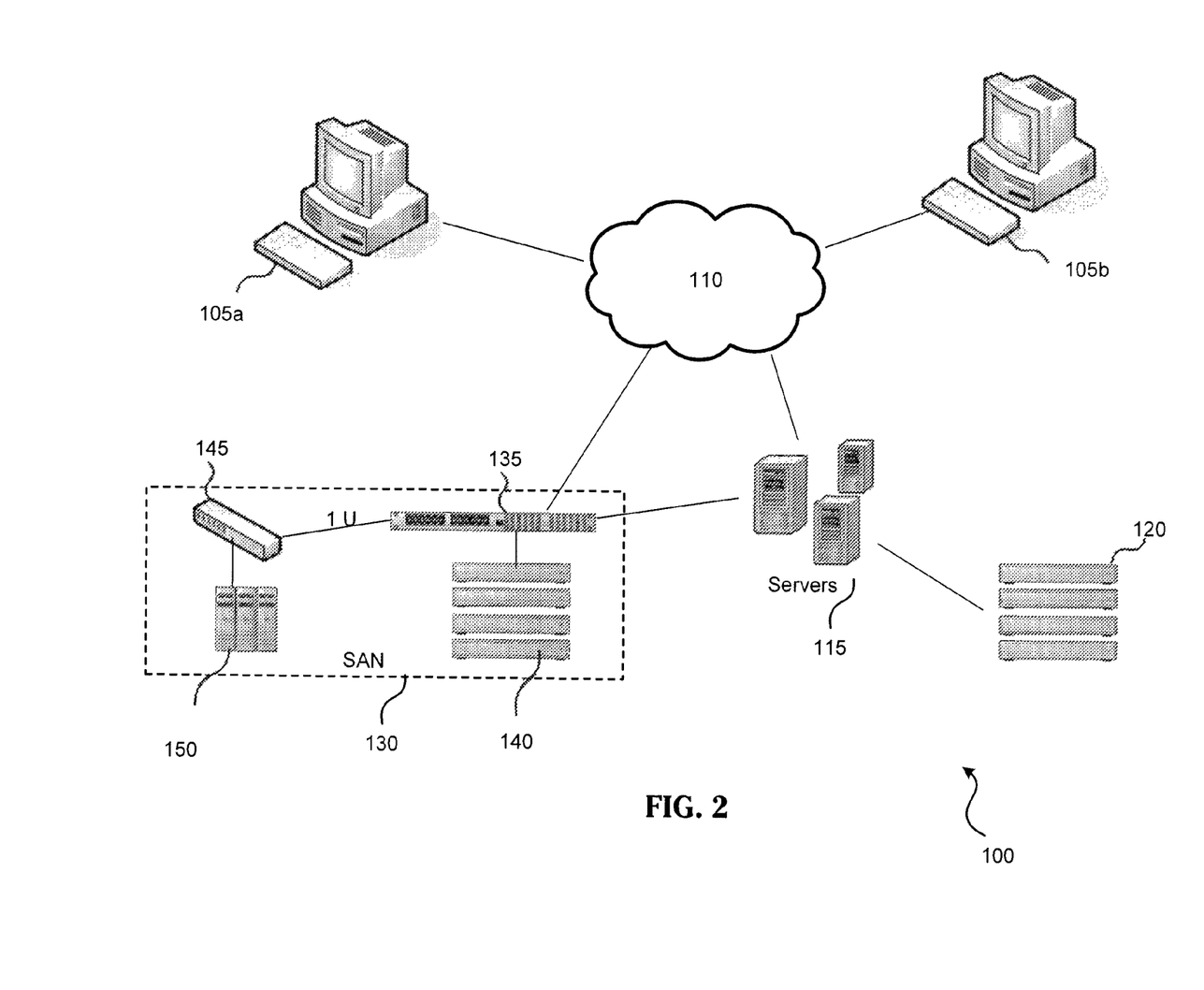
FIG. 2 is a block diagram illustrating one possible configuration of a network that can serve as an example environment in which the present invention can be implemented.

With continued reference to FIG. 2, the illustrated exemplary system 100 can provide data access and storage redundancy by storing data at multiple locations such as server 115, disk arrays 120 and 140, or tape server 150. Server 115 can be groups of remote servers; each group may be locally or remotely connected with other groups via a network similar to network 110. As shown in FIG. 2, server 115 may access data or backup data to disk array 140 or tape server 150 through network 110 or via a direct connection to switch 135. In this way, server 115 has the flexibility of accessing array 140 or tape server 150 via multiple connections and thereby avoids network bottlenecks.

In various embodiments, switch 135 is an FC data switch and tape server 150 is SCSI type server. In this embodiment, router 145 is configured to transfer data between a FC data bus of FC switch 135 and a SCSI bus of SCSI tape server 150. Although a specific architecture is described above, components of the storage pool 130 may have a different architecture or combination of architectures such as, for example, SATA, SAS, and FC.

In system 100, data redundancy can be implemented in the storage pool 130 by implementing a Redundant Array of Independent Disks (RAID) across disk array 140. Parity data needed for reconstructing a failed data sector can be distributed by a RAID controller (not shown) located in the storage pool 130, across array 140, or separately to tape server 150, or across both array 140 and tape server 150. In this setup, clients 105*a-b* typically cannot access data stored within the storage pool 130 network when a critical component (e.g., motherboard, switch 135, power supply, etc.) of node 130 fails.

From time to time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 3:
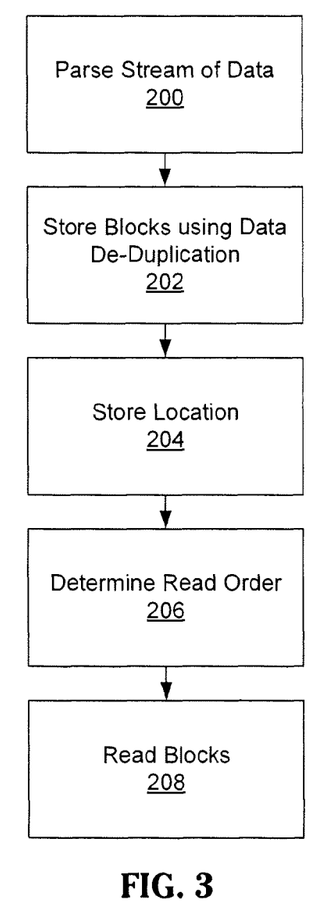
FIG. 3 is a flowchart illustrating an example method in accordance with various embodiments of the systems and methods described herein.

FIG. 3 is a flowchart illustrating an example method in accordance with various embodiments of the systems and methods described herein. Referring now to FIG. 3, in data storage including a data de-duplication system, the system may break a data stream into a block or multiple blocks of data. For example, in a step 200 a data stream may be parsed.

In a step 202 the block or blocks of data may be stored, for example, in a data storage device. In accordance with some embodiments of the systems and methods described herein, the data storage device may be a disk drive, tape drive, or other data storage device. Additionally, in some embodiments, multiple data storage devices may be connected together in an array of storage devices. For example, an array of disk drives, an array of tape drives, or an array of other types of data storage devices might be used. Additionally, various embodiments might include multiple types of data storage devices, for example, disk drives and tape drives.

In a step 204, a location for each block may be stored. In accordance with some embodiments of the systems and methods described herein, storing a location for each block of data may comprise storing a location to a pointer that points to a block of data or storing a pointer that points directly to a block of data. If a pointer that points directly to a block of data is used, this may eliminate additional reads to the data storage system because the location may be read directly, rather than reading the pointer and then reading the block of data at the address indicated by the pointer. In some embodiments, the location of each block may comprise a physical location on a storage media. For example, a physical location or an indication of a physical location on a platter of a hard drive might be stored.

In a step 206, a read order may be determined. For example, in one embodiment, the determination of the order to read the blocks might be based on the location of each block on the data storage device.

In a step 208, the blocks may be read using the order determined. Additionally, in various embodiments, the data blocks may be buffered and reordered after being read. This may be, for example, in an addressable memory that can use electronic, rather than manual techniques for reading blocks. Accordingly, such systems may not have reposting issues.

For example, the example method of FIG. 3 may be applied to the data de-duplication system of FIG. 1. For example, in step 200 of FIG. 2, as further illustrated in FIG. 5, the data stream might be parsed. For example, file A is parsed into blocks R, G, Y, B and O; and file B into blocks Gr, B, A, Y, G, B and R. In the step 202, the blocks might be stored using data de-duplication, as further illustrated in FIG. 1. The location information for the blocks, which might be stored on disk 54, may be stored in step 204 of FIG. 3.

In various embodiments, the de-duplication process might acquire the physical location information associated with each block of a file that is to be read. This location information might be acquired either from the storage pool at the time of the request or from saved block information, for example, from the tags associated with the file. If file B of FIG. 1 is to be read, for example, the tags identifying file B might be read and location information might be determined.

An example system implementing the systems and methods described herein might use physical location to determine the read order. (Step 206 of FIG. 3.) A system implementing these systems and methods might then perform data reads in the order of the physical location, as illustrated in step 208 of FIG. 3.

For example, the physical location of blocks needed for file B is 1, 2, 3, 4, 7, and 8. This is not the order of the blocks in the file, but is the order that the blocks occur on the, for example, disk drive. It will also be understood that the order might also be modified, for example, based on the present location of a read head or other read device. For example, if the read head is near block 3, the read order might be modified to read 3, 4, 7, 8, 1, and 2. The read order selected might vary from implementation to implementation.

In some embodiments, the system might then write the data out to the specified destination file at the appropriate associated block offsets, thus requiring no position commands prior to each block read and thus suffering no associated degradation in read performance. In some embodiments, the write performance to the specified file might not suffer any degradation as device driver caching and device buffering may handle this type of write operation. As described herein, the data reads may be controlled by the location that data de-duplication writes blocks. These are generally controlled by the data de-duplication system.

Some embodiments of the systems and methods described herein might use the ordering or re-ordering of data retrieval via reference pointers to improve read performance for the storage medium. For example, some embodiments may perform reads sequentially instead of, for example, processing the reference pointers in the data reassembly order.

In some cases, a file that has been de-duplicated may be represented as a collection of pointers referring to the data needed to reassemble the file. When the original file is accessed later, a typical approach is to retrieve the data in the order of reassembly. While this may be logical from a data perspective, it is usually inefficient for the storage medium containing the data, as it incurs expensive overhead as the storage medium may be repositioned several times. In some embodiments, the data de-duplication application might retrieve the data in an order that is based on, for example, the physical layout of blocks on a storage medium. The file may, in some embodiments, be reassembled by filling in the data as it becomes available.

Figure 4:
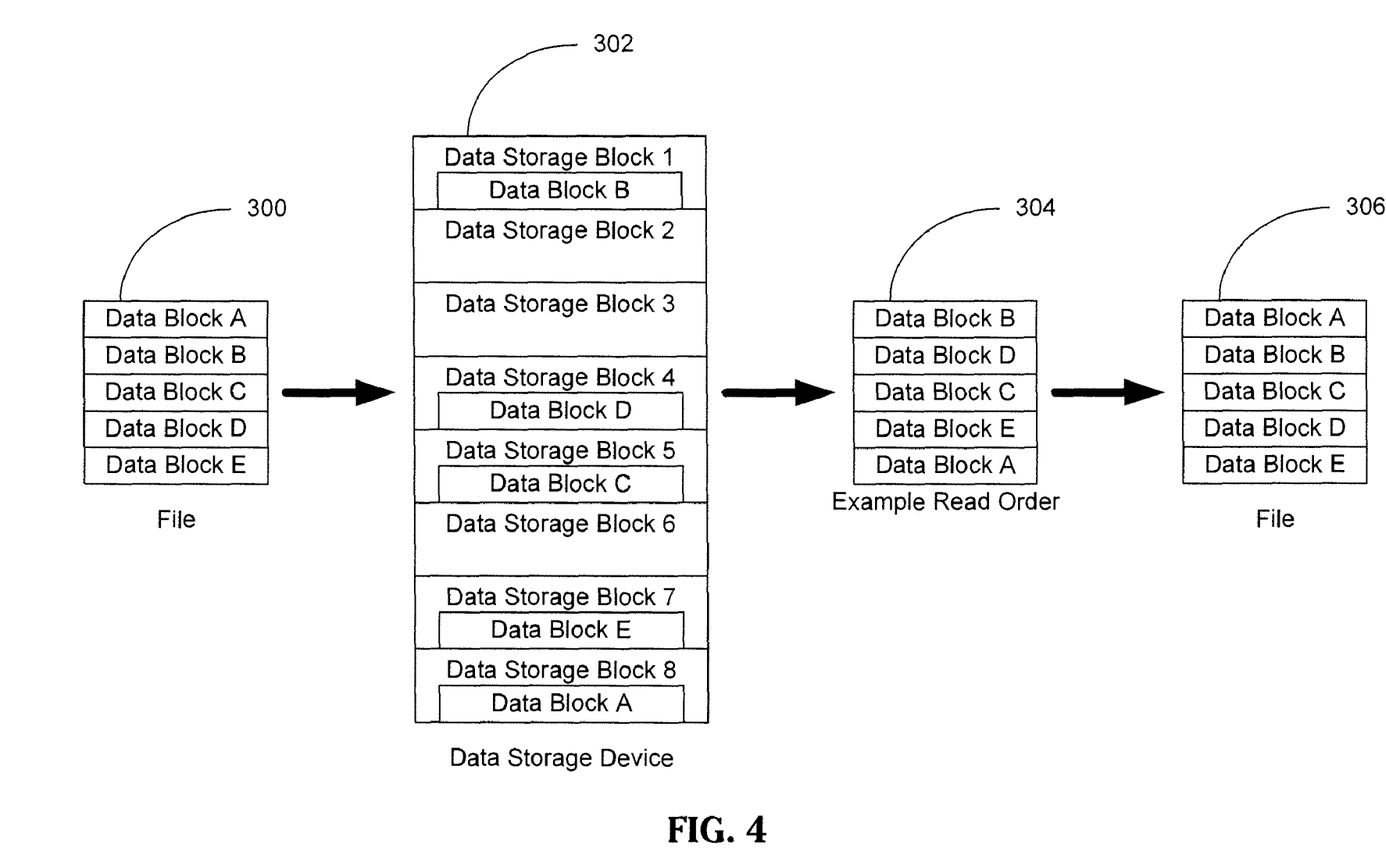
FIG. 4 is a diagram illustrating an example method in accordance with various embodiments of the systems and methods described herein.

FIG. 4 is a diagram illustrating an example method in accordance with various embodiments of the systems and methods described herein. Referring now to FIG. 4, a file 300 might include data blocks A-E. These data blocks may be stored on a data storage device 302. As discussed above, this device might be a disk drive or other data storage device.

The order that the data blocks A-E may be stored on the data storage device 302 might not match the order of storage blocks 1-8. For example, as illustrated in the example of FIG. 4, data storage block 1 might store data block B. Additionally, data storage block 4 might store data block D, data storage block 5 might store data block C, data storage block 7 might store data block E, and data storage block 8 might store data block A. Accordingly, one example read order might be data block B, data block D, data block C, data block E, followed by data block A; as illustrated by example read order 304 of FIG. 4. Similar to the discussion above, if a read device, such as a read head, happens to be near, for example, data block C, a read might start at that physical location. In various embodiments, using a buffer, or other memory device, the original file might be reconstructed as illustrated by file 306.

As illustrated in the example of FIG. 4, the file reference order is A, B, C, D, and E. (See file 300.) One example read order is B, D, C, E, and A. In various embodiments, the file may be read by performing various reads and storing the information read in memory, another file, or some other data structure, such that the data might be assembled back into the file order as illustrated in file 306. It will be understood that in some embodiments the order might not matter. Table 1, below further illustrates the example read order 304 and the regeneration of file 306. At read 1, block B might be read. Block B is then available in the data structure of the table for the rest of the reads, as illustrated. At read 2, block D is read and is then available for the rest of the reads. Blocks C, E, and A are also read and available as illustrated.

TABLE 1

| Read 1 |         | Block B |         |         |         |
|--------|---------|---------|---------|---------|---------|
| Read 2 |         | Block B |         | Block D |         |
| Read 3 |         | Block B | Block C | Block D |         |
| Read 4 |         | Block B | Block C | Block D | Block E |
| Read 5 | Block A | Block B | Block C | Block D | Block E |

Figure 5:
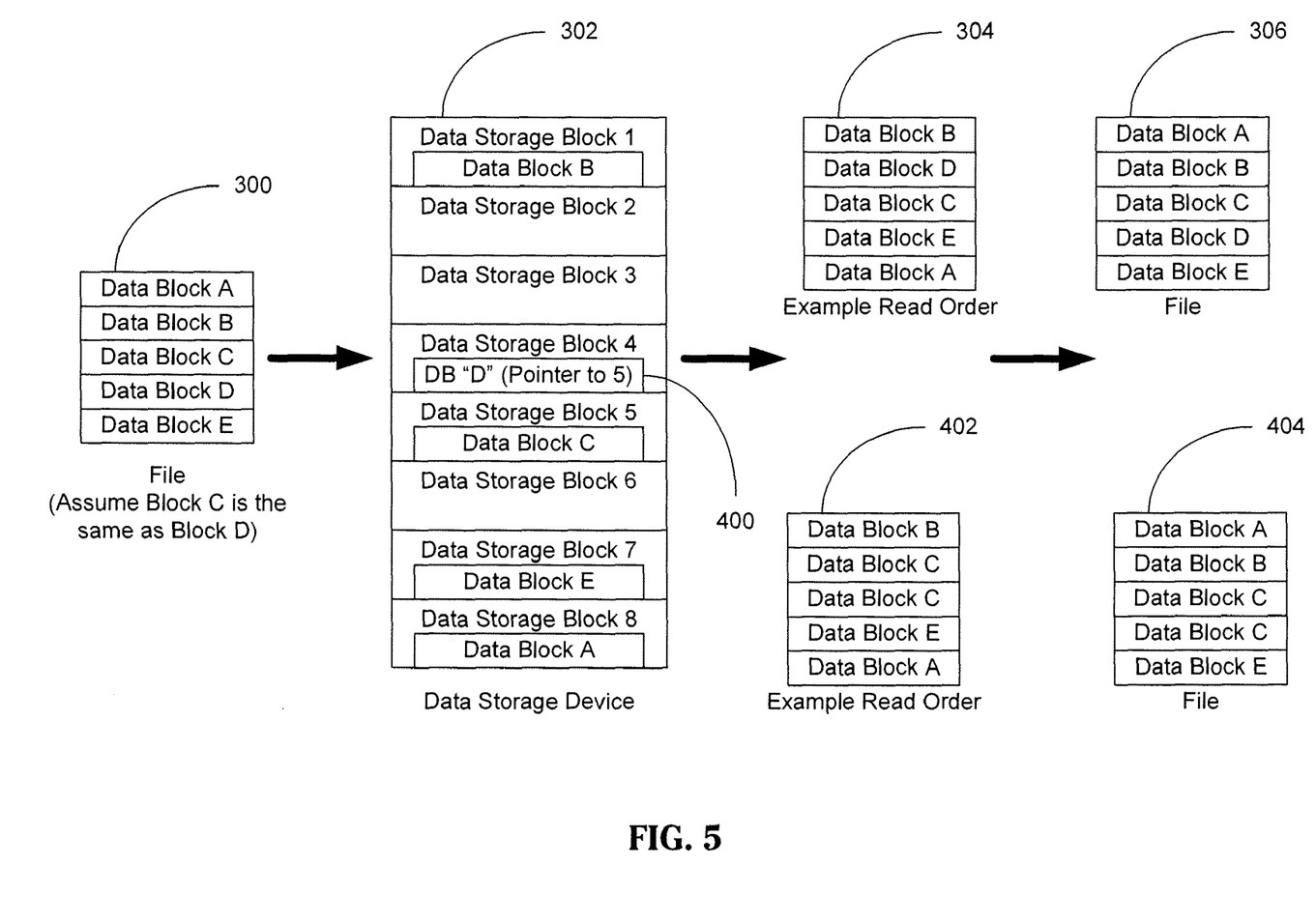
FIG. 5 is a diagram illustrating another example method in accordance with various embodiments of the systems and methods described herein.

FIG. 5 is a diagram illustrating another example method in accordance with various embodiments of the systems and methods described herein. Referring now to FIG. 5, the file 300 might include data blocks A-E, as discussed with respect to FIG. 4. In this example, further assume that block C contains the same data as block D. Accordingly, data storage block 4 might contain a pointer to data storage block 5. In this way some part of data storage block 4, for example, the part that does not contain the pointer to data storage block 5, might be used to store other data.

The example read order 402 is further illustrated in table 2, below. In various embodiments, storing a location for each block of data may comprise determining that, for example, block C is the same as block D and storing a pointer to block C. This pointer may be stored within the system that determines the read order. When that data is needed, the pointer might already be known, and accordingly, does not need to be read from data storage. As illustrated, when the data is needed, the pointer to block C will cause the system to read block C in place of block D in read 2. At read 3, block C may be read when block C is needed. In some embodiments, a single read of block C might be used to determine the data of both blocks C and D.

TABLE 2

| Read 1 |         | Block B |         |             |         |
|--------|---------|---------|---------|-------------|---------|
| Read 2 |         | Block B |         | Block C (=D)|         |
| Read 3 |         | Block B | Block C | Block C     |         |
| Read 4 |         | Block B | Block C | Block C     | Block E |
| Read 5 | Block A | Block B | Block C | Block C     | Block E |

Accordingly, in other various embodiments, storing a location for each block of data may comprise storing a location to a pointer to a block of data. One example of such a method is illustrated below with respect to table 3. In some embodiments, the fact that data block C is the same as data block D might be known by the system that determines the read order.

In that case, the system might simply replace the data read in data storage block 4 of FIG. 4 with a read of data storage block 5 to acquire the data in block C, as illustrated by example read order 402 and table 3 below. In various other embodiments, block 4 might be read to determine that the needed data is located at block 5. For example a pointer to block 5 might be read when the system reads block 4, as illustrated at data block "D", the pointer to data storage block 5, 400.

TABLE 3

| | | | | | |
|---|---|---|---|---|---|
| Read 1 | | Block B | | | |
| Read 2 | | Block B | | Ptr. (Blk. C) | |
| Read 3 | | Block B | Block C | → Block C | |
| Read 4 | | Block B | Block C | Block C | Block E |
| Read 5 | Block A | Block B | Block C | Block C | Block E |

In the example of table 3, the pointer to block C is stored in a location. When that location is read, it is found to contain the pointer. The pointer may then be stored in the buffer, as illustrated in table 3. In some cases, the pointer read may provide the data for each instance of the block. For example, as illustrated in table 3, read 3 provides the block C data for block C and Block D. In some examples, additional reads might be necessary. For example, if each instance of a block is not known when a read occurs.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of data storage in a data de-duplication system comprising:
   receiving a first order to read blocks of data;
   determining a second order to read blocks of data based on a location of the blocks stored on a data storage device in the data de-duplication system, where the second order is configured to improve read performance as compared to the first order;
   reading the blocks in the second order; and
   buffering and reordering the blocks to comply with the first order.

2. The method of claim 1, comprising breaking a data stream into multiple blocks of data and storing a unique block of data on the data storage device of the data de-duplication system.

3. The method of claim 1, where a code representing a redundant block of data comprises a hash.

4. The method of claim 1, where storing a location for an individual block of data comprises storing a location to a pointer to a block of data.

5. The method of claim 1, where storing a location for an individual block of data comprises storing a pointer to a block of data.

6. The method of claim 1, where the data storage device comprises at least one of a disk drive and a tape drive.

7. The method of claim 1, where the second order is determined based on the location of the blocks stored on the data storage device relative to a read device.

8. The method of claim 1, where the data storage device comprises multiple data storage devices connected together in an array of storage devices.

9. The method of claim 8, where the array of storage devices comprises an array of disk drives.

10. The method of claim 1, where the location of an individual block comprises a physical location on a storage media.

11. A data de-duplication system comprising:
a data storage device configured to store data using data de-duplication;
a memory configured to store instructions;
a processor configured to read the memory and execute the instructions, the instructions configured to cause the processor to:
receive a first order to read blocks;
determine a second order to read the blocks based on a location of blocks on the data storage device, where the second order is configured so that fewer position commands are required prior to the blocks being read when compared to the first order;
read the blocks in the second order determined; and buffer and reorder the data blocks to comply with the first order.

12. The data storage system of claim 11, where the instructions are further configured to cause the processor to break a data stream into multiple blocks of data and store a unique block of data on the data storage device using data de-duplication.

13. The data storage system of claim 12, where a code representing a redundant block of data comprises a hash.

14. The data storage system of claim 11, where storing a location for an individual block of data comprises storing a location to a pointer to a block of data.

15. The data storage system of claim 11, where storing a location for an individual block of data comprises storing a pointer to a block of data.

16. The data storage system of claim 11, where the data storage device comprises at least one of a disk drive and a tape drive.

17. The data storage system of claim 11, where the second order is determined based on the location of the blocks stored on the data storage device relative to a read device.

18. The data storage system of claim 11, where the data storage device comprises multiple data storage devices connected together in an array of storage devices.

19. The data storage system of claim 18, where the array of storage devices comprises an array of disk drives.

20. The data storage system of claim 11, where the location of an individual block comprises a physical location on a storage media.

* * * * *